(12) United States Patent
Kyriakidou et al.

(10) Patent No.: US 10,427,137 B2
(45) Date of Patent: Oct. 1, 2019

(54) EXHAUST TREATMENT CATALYSTS WITH ENHANCED HYDROTHERMAL STABILITY AND LOW-TEMPERATURE ACTIVITY

(71) Applicant: UT-Battelle, LLC, Oak Ridge, TN (US)

(72) Inventors: Eleni Kyriakidou, Amherst, NY (US); Todd J. Toops, Knoxville, TN (US); Jae-Soon Choi, Knoxville, TN (US); Michael J. Lance, Knoxville, TN (US); James E. Parks, II, Knoxville, TN (US)

(73) Assignee: UT-Battelle, LLC, Oakridge, TN (US)

( * ) Notice: Subject to any disclaimer, the term of this patent is extended or adjusted under 35 U.S.C. 154(b) by 0 days.

(21) Appl. No.: 15/906,606

(22) Filed: Feb. 27, 2018

(65) Prior Publication Data

US 2018/0250659 A1   Sep. 6, 2018

Related U.S. Application Data

(60) Provisional application No. 62/463,808, filed on Feb. 27, 2017.

(51) Int. Cl.
| | |
|---|---|
| *B01D 53/94* | (2006.01) |
| *B01J 21/08* | (2006.01) |
| *B01J 23/10* | (2006.01) |
| *B01J 23/44* | (2006.01) |
| *F01N 3/10* | (2006.01) |
| *B01J 37/02* | (2006.01) |
| *B01J 23/63* | (2006.01) |
| *B01J 35/00* | (2006.01) |
| *B01J 35/04* | (2006.01) |

(52) U.S. Cl.
CPC ............ *B01J 23/44* (2013.01); *B01D 53/944* (2013.01); *B01D 53/9445* (2013.01); *B01J 21/08* (2013.01); *B01J 23/10* (2013.01); *B01J 23/63* (2013.01); *B01J 35/002* (2013.01); *B01J 35/008* (2013.01); *B01J 35/0013* (2013.01); *B01J 35/04* (2013.01); *B01J 37/0207* (2013.01); *B01J 37/0244* (2013.01); *B01J 37/0248* (2013.01); *F01N 3/10* (2013.01); *B01D 2255/1023* (2013.01); *B01D 2255/2065* (2013.01); *B01D 2255/2092* (2013.01); *B01D 2255/20715* (2013.01); *B01D 2255/30* (2013.01); *B01D 2255/407* (2013.01); *B01D 2255/90* (2013.01); *F01N 2370/02* (2013.01); *F01N 2370/04* (2013.01)

(58) Field of Classification Search
CPC ............ B01D 53/94; B01D 2255/1021; B01D 2255/1023; B01D 2258/01; B01D 53/9445; B01D 53/945; B01J 23/42; B01J 23/44; B01J 35/0006; B01J 35/006; B01J 35/023; B01J 2523/824; B01J 2523/828; F01N 3/101; F01N 3/2803; F01N 3/2807; F01N 2570/10; F01N 2570/14
See application file for complete search history.

(56) References Cited

U.S. PATENT DOCUMENTS

| | | | | |
|---|---|---|---|---|
| 6,680,279 B2 * | 1/2004 | Cai | ............. | B01D 53/94 502/303 |
| 8,574,520 B2 * | 11/2013 | Koplin | ............. | B01D 53/94 423/213.5 |
| 9,511,352 B2 * | 12/2016 | Qi | ............. | B01J 21/04 |
| 10,232,354 B2 * | 3/2019 | Witte | ............. | C07C 29/17 |
| 10,258,967 B2 * | 4/2019 | Witte | ............. | C07C 29/17 |
| 2003/0139288 A1 * | 7/2003 | Cai | ............. | B01D 53/94 502/303 |
| 2014/0057781 A1 * | 2/2014 | Stamm Masias | ............. | B01J 23/63 502/263 |
| 2019/0126247 A1 * | 5/2019 | Deeba | ............. | F01N 3/20 |
| 2019/0160427 A1 * | 5/2019 | Deeba | ............. | B01J 37/0244 |

FOREIGN PATENT DOCUMENTS

| | | | | | |
|---|---|---|---|---|---|
| CN | 106732578 | * | 5/2017 | ............. | B01D 53/945 |
| WO | WO 2017153893 A1 | * | 9/2017 | ............. | B01D 53/94 |
| WO | WO 2017205042 A3 | * | 7/2018 | ............. | B01D 53/94 |

OTHER PUBLICATIONS

Kim M. et al., "Enhancing low-temperature activity and durability of Pd-based diesel oxidation catalysts using ZrO2 supports", Applied Catalysis B: Environmental (2016), vol. 187, pp. 181-194 http://dx.doi.org/10.1016/j.apcatb.2016.01.023.

* cited by examiner

*Primary Examiner* — Timothy C Vanoy
(74) *Attorney, Agent, or Firm* — Scully Scott Murphy & Presser, P.C.

(57) ABSTRACT

A catalyst for treating fuel combustion exhaust, the catalyst comprising the following components: (i) an oxide support comprising silicon oxide, aluminum oxide, or combination of silicon and aluminum oxides; (ii) cerium oxide, zirconium oxide, or a combination of cerium and zirconium oxides in contact with said oxide support; and (iii) nanoparticles comprising elemental palladium or platinum in contact with at least component (ii), wherein said palladium or platinum is present in an amount of 0.1-4 wt. % by weight of the particles, and wherein surfaces of said nanoparticles of elemental palladium or palladium are exposed and accessible to said fuel combustion exhaust. Methods of producing and using the catalyst are also described.

20 Claims, 12 Drawing Sheets

EXHAUST TREATMENT CATALYSTS WITH ENHANCED HYDROTHERMAL STABILITY AND LOW-TEMPERATURE ACTIVITY

CROSS REFERENCE TO RELATED APPLICATION

The present application claims benefit of U.S. Provisional Application No. 62/463,808, filed on Feb. 27, 2017, all of the contents of which are incorporated herein by reference.

STATEMENT REGARDING FEDERALLY SPONSORED RESEARCH

This invention was made with government support under Contract Number DE-AC05-00OR22725 between the United States Department of Energy and UT-Battelle, LLC. The U.S. government has certain rights in this invention.

FIELD OF THE INVENTION

The present invention relates to the field of emissions processing catalysts, and particularly, to catalysts used in treating diesel engine emissions.

BACKGROUND OF THE INVENTION

Future diesel oxidation catalysts (DOC) will need to perform effectively at increasingly low exhaust temperatures as a result of continued improvements in diesel engine efficiency. An ultimate goal is to achieve over 90% conversion below 150° C., the so-called "150° C. challenge". Recently, progress has been made in designing catalytic materials with enhanced low-temperature oxidation performance, such as by combining gold and silver nanoparticles with copper, manganese, or iron. However, significant technical barriers need to be surmounted before such novel materials are ready for commercial use. In particular, such novel materials tend to underperform when subjected to harsh reaction environments typical to automotive emissions. Alternatively, increasing precious metal loading (e.g., Pt) can improve the low-temperature performance of current commercial catalysts, but such an approach is cost-prohibitive.

The impact of $ZrO_2$ supports on CO and $C_3H_6$ oxidation, sulfur tolerance, and hydrothermal stability was recently investigated, e.g., *Appl. Catal. B*187 (2016) 181. A strong interaction between Pd and $ZrO_2$ resulted in a greater thermal stability, as evidenced by good oxidation performance even after aging at 800 and 900° C. for 16 hours; however, $Pd/ZrO_2$ is known to suffer performance loss due to $ZrO_2$ phase transformation. Thus, further improvements in hydrothermal stability and low-temperature performance would be of great benefit to diesel oxidation catalysts.

SUMMARY OF THE INVENTION

In a first aspect, the invention is directed to a catalyst for treating exhaust from fossil fuel combustion, and particularly diesel engine exhaust. The catalyst exhibits an exceptional hydrothermal stability and low-temperature performance, which makes the catalyst particularly suited for the ongoing improvements in diesel engine efficiency. The catalyst contains the following components: (i) an oxide support containing silicon oxide, aluminum oxide, or a combination of silicon and aluminum oxides; (ii) cerium oxide, zirconium oxide, or a combination of cerium and zirconium oxides in contact with said oxide support; and (iii) nanoparticles containing elemental palladium or platinum in contact with at least component (ii), wherein the palladium or platinum is present in an amount of 0.1-4 wt. % by weight of the particles, and wherein surfaces of the nanoparticles of elemental palladium or palladium are exposed and accessible to the fuel combustion exhaust.

In some particular embodiments, the catalyst contains: (i) an inner core containing silicon oxide, aluminum oxide, or combination of silicon and aluminum oxides; (ii) an outer layer containing zirconium oxide or cerium oxide or combination of zirconium and cerium oxides as a coating on the inner core; and (iii) nanoparticles of elemental palladium or platinum in contact with at least component (ii). In other particular embodiments, the catalyst contains: (i) particles containing silicon oxide, aluminum oxide, or combination of silicon and aluminum oxides; (ii) nanoparticles of cerium oxide, zirconium oxide, or a combination of cerium and zirconium oxides embedded within nanoparticles of component (i), provided that at least a portion of the nanoparticles of cerium oxide, zirconium oxide, or combination of cerium and zirconium oxides are not completely embedded within the particles of component (i); and (iii) nanoparticles of elemental palladium or platinum in contact with at least component (ii).

In another aspect, the invention is directed to a method of fuel combustion exhaust using the catalyst described above. The method includes contacting the fuel combustion exhaust with the catalyst, typically at a temperature of 100-900° C. The catalyst may be in its fresh or hydrothermally aged stated, with the typical hydrothermal aging process including a step of subjecting the catalyst to a temperature of 800-900° C. for at least 8 hours. In some embodiments, the catalyst exhibits at least or greater than 50%, 60%, 70%, 80%, 90%, or 95% conversion of CO, total hydrocarbon, or $NO_x$ at a temperature of 150° C., 200° C., 250° C., 300° C., 350° C., or 400° C. The catalyst may, in some embodiments, be housed within a catalytic converter.

DETAILED DESCRIPTION OF THE INVENTION

Figure 1:
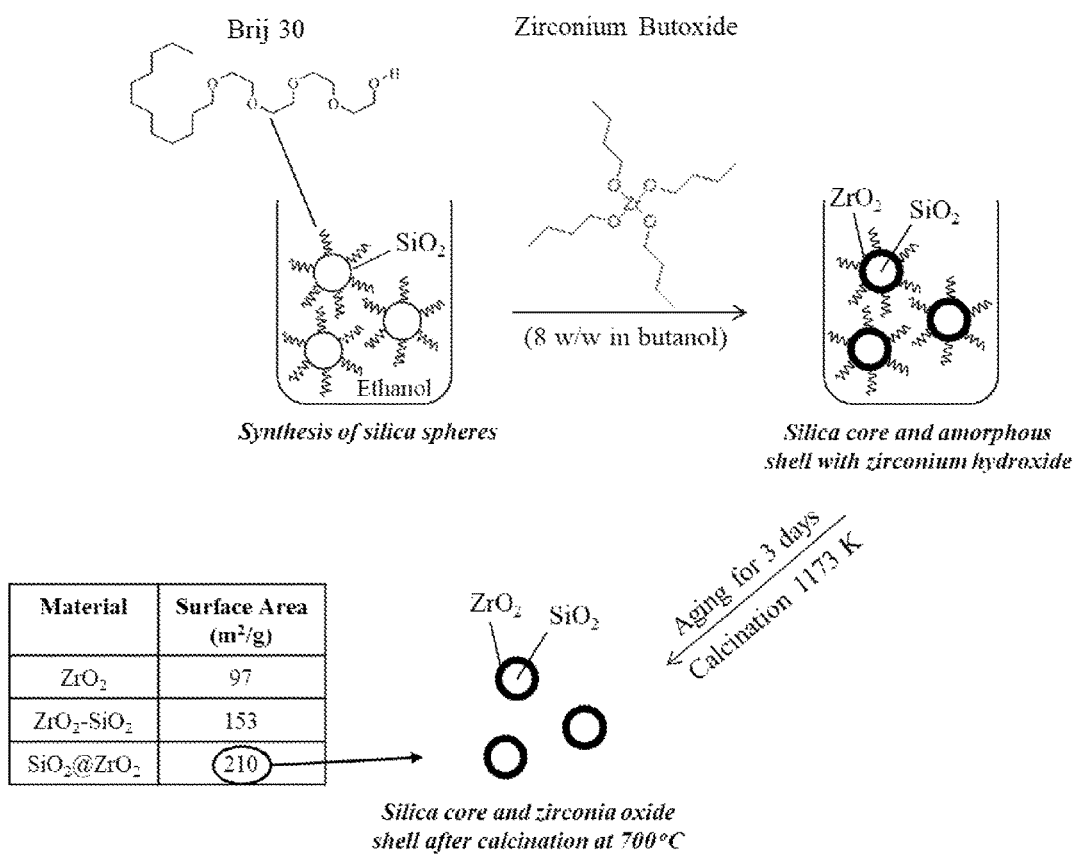
FIG. 1. Schematic showing an exemplary procedure for synthesizing a $SiO_2$@$ZrO_2$ core-shell mixed oxide composition.

In one aspect, the present disclosure is directed to a catalyst for treating (i.e., decomposing to remove or reduce) polluting chemicals, such as carbon monoxide (CO), total hydrocarbon, or $NO_x$ emissions, from fuel combustion exhaust, particularly where the fuel is a fossil fuel, such as gasoline or diesel. The catalyst is typically included within a housing within which the gases of combustion enter and are confined in order to permit maximum contact of the gases of combustion with the catalyst. In some embodiments, the housing is a simple container. In other embodiments, the housing is part of a catalytic converter, which may be a two-way or three-way catalytic converter. The catalytic converter may also be part of a larger emission control system, such as by including an oxygen sensor, air-fuel ratio meter, and air-fuel ratio adjuster, as typically included in automobiles. Moreover, the catalyst may be used as a reduction and/or oxidation catalyst in its capacity for treating fuel combustion exhaust. The catalyst may also be used in monolithic form or supported on a suitable refractory support, such as a honeycomb or ceramic bead support.

The catalyst includes, as a first component (i.e., "component i"), an oxide support containing silicon oxide (generally, $SiO_2$, i.e., silica), aluminum oxide (generally, $Al_2O_3$, i.e., alumina), or a combination of silicon and aluminum oxides. The silicon oxide or aluminum oxide or combination thereof is preferably refractory by being able to withstand temperatures of at least 500° C., 600° C., 700° C., 800° C., or 900° C. without decomposing. The silicon oxide (typically silica) can be any of the known forms of silicon oxide, including amorphous, crystalline, fumed, gel, and aerogel forms of silicon oxide. The aluminum oxide (typically alumina) can be any of the known forms of aluminum oxide, including amorphous, crystalline (e.g., $\alpha$-$Al_2O_3$), and any of its other less common phases (e.g., $\beta$-, $\gamma$-, $\delta$-, and $\chi$-$Al_2O_3$). Component (i) may be in continuous form or in the form of discrete or agglomerated particles. Typically, component (i) is in the form of particles, such as nanoparticles or microparticles. The particles may be in the form of primary particles in a dispersed state or in the form of agglomerated particles. Particles of component (i) are generally spherical or approximately spherical, and typically have a size of, for example, 50, 100, 150, 200, 250, 300, 400, 500, 600, 700, 800, 900, or 1000 nm, or a size within a range bounded by any two of the foregoing values. In some embodiments, silicon oxide and aluminum oxide are not in combination, i.e., silicon oxide is used in the absence of aluminum oxide, or aluminum oxide is used in the absence of silicon oxide.

In cases where silicon and aluminum oxides are in combination in component (i), the two oxides may be in a homogeneous mixed (single-phase) state or in a heterogeneous (two-phase) state. In some embodiments, the combination of silicon and aluminum oxides may correspond to a zeolite. The zeolite considered herein can be any of the porous aluminosilicate structures known in the art that are stable under high temperature conditions, i.e., of at least 150° C., 200° C., 300° C., 400° C., 500° C., 600° C., 700° C., 800° C., 850° C., or 900° C. The zeolite is typically ordered by having a crystalline or partly crystalline structure. The zeolite can generally be described as a three-dimensional framework containing silicate ($SiO_2$ or $SiO_4$) and aluminate ($Al_2O_3$ or $AlO_4$) units that are interconnected (i.e., crosslinked) by the sharing of oxygen atoms. The zeolite may be, for example, an MFI-type zeolite, MEL-type zeolite, MTW-type zeolite, MCM-type zeolite, BEA-type zeolite, kaolin, or a faujasite-type of zeolite. Some particular examples of zeolites include the ZSM class of zeolites (e.g., ZSM-5, ZSM-8, ZSM-11, ZSM-12, ZSM-15, ZSM-23, ZSM-35, ZSM-38, ZSM-48), zeolite X, zeolite Y, zeolite beta, and the MCM class of zeolites (e.g., MCM-22 and MCM-49). In some embodiments, one or more of the above zeolites, or all zeolites, are excluded.

The catalyst includes, as a second component (i.e., "component ii"), cerium oxide ($CeO_2$), zirconium oxide ($ZrO_2$), or a combination of cerium and zirconium oxides in contact with the oxide support of component (i). In cases where cerium and zirconium oxides are in combination in component (ii), the two oxides may be in a homogeneous mixed (single-phase) state or in a heterogeneous (two-phase) state. Component (ii) may be in continuous form or in the form of discrete or agglomerated nanoparticles. Typically, component (ii) is in the form of nanoparticles. The nanoparticles may be in the form of primary particles in a dispersed state or in the form of agglomerated particles. The nanoparticles of component (ii) are typically precisely or approximately spherical, and typically have a size of, for example, 1, 2, 5, 10, 15, 20, 25, 30, 40, 50, or 100 nm, or a size within a range bounded by any two of the foregoing values. In some embodiments, cerium oxide and zirconium oxide are not in combination, i.e., cerium oxide is used in the absence of zirconium oxide, or zirconium oxide is used in the absence of cerium oxide.

The catalyst may, by one set of embodiments, contain silicon oxide. In a first exemplary embodiment, silicon oxide is in combination with cerium oxide. In a second exemplary embodiment, silicon oxide is in combination with zirconium oxide. In a third exemplary embodiment, silicon oxide is in combination with zirconium oxide and cerium oxide. In any of the foregoing embodiments, the silicon oxide, cerium oxide and/or zirconium oxide may independently be in continuous form or in the form of discrete or agglomerated particles. In some embodiments, a combination of zirconium oxide and cerium oxides is present as either separate nanoparticles of zirconium oxide and cerium oxide or as nanoparticles having a mixed zirconium oxide-cerium oxide composition. In some embodiments, any one or more of the above embodiments are excluded.

The catalyst may, by another set of embodiments, contain aluminum oxide. In a first exemplary embodiment, aluminum oxide is in combination with cerium oxide. In a second exemplary embodiment, aluminum oxide is in combination with zirconium oxide. In a third exemplary embodiment, aluminum oxide is in combination with zirconium oxide and cerium oxide. In any of the foregoing embodiments, the aluminum oxide, cerium oxide and/or zirconium oxide may independently be in continuous form or in the form of discrete or agglomerated particles. In some embodiments, a combination of zirconium oxide and cerium oxides is present as either separate nanoparticles of zirconium oxide and cerium oxide or as nanoparticles having a mixed zirconium oxide-cerium oxide composition. In some embodiments, one or more of the above embodiments are excluded.

The catalyst may, by another set of embodiments, contain a combination of silicon oxide and aluminum oxide. The combination of silicon and aluminum oxides may be present in continuous form or in the form of discrete or agglomerated particles. In some embodiments, a combination of silicon and aluminum oxides is present as either separate particles of silicon oxide and aluminum oxide or as particles having a mixed silicon oxide-aluminum oxide composition. In a first exemplary embodiment, a combination of silicon and aluminum oxides is in combination with cerium oxide. In a second exemplary embodiment, a combination of silicon and aluminum oxides is in combination with zirconium oxide. In a third exemplary embodiment, a combination of silicon and aluminum oxides is in combination with zirconium oxide and cerium oxide, wherein the combination of cerium oxide and/or zirconium oxide may be in continuous form or in the form of discrete or agglomerated particles, as discussed above. In some embodiments, one or more of the above embodiments are excluded.

Components (i) and (ii) are in direct physical contact with each other. As further discussed below, components (i) and (ii) can be in direct physical contact with each other in, for example, a core-shell type of arrangement or mixed particle (embedded) arrangement. The foregoing types of arrangements between components (i) and (ii) are examples of "combined arrangements of components (i) and (ii)." Notably, the various combined arrangements of components (i) and (ii) can be considered as discrete conglomerates of oxides, with each discrete conglomerate possessing its own surfaces, surface area, and average overall size. Indeed, each discrete conglomerate of components (i) and (ii) can be considered a core having a surface on which nanoparticles of component (iii) reside.

In some embodiments, components (i) and (ii) are in combination in a core-shell arrangement, wherein component (i) functions as an inner core and component (ii) functions as a shell (i.e., outer layer or coating) surrounding the inner core. Component (ii) may be in continuous form or in the form of discrete or agglomerated particles when surrounding the inner core. In some embodiments, components (i) and (ii) are independently particles, particularly nanoparticles. The particles may independently have any of the exemplary sizes earlier provided above. The term "surrounding," as used herein, refers to substantial (i.e., at least 80 or 90% coverage) or complete (i.e., at or about 100%) coverage of the surfaces of particles of component (i). For example, in some embodiments, silicon oxide is in contact with and surrounded by (coated with) zirconium oxide, cerium oxide, or zirconium oxide and cerium oxide. In the case of a combination of cerium and zirconium oxides, the combination may be in continuous form or in the form of particles, particularly nanoparticles. In some embodiments, the combination of cerium and zirconium oxides corresponds to separate nanoparticles of zirconium oxide and cerium oxide or to nanoparticles having a mixed zirconium oxide-cerium oxide composition. As another example, in some embodiments, aluminum oxide is in contact with and surrounded by zirconium oxide, cerium oxide, or zirconium oxide and cerium oxide. In some embodiments, particles of component (i) are larger than particles of component (ii). For example, in some embodiments, the particles of component (i) may have a size of about 100, 200, 300, or 400 nm, while particles of component (ii) have a size of about 1, 2, 5, 10, 20, 30, 40, or 50 nm. As further discussed below, nanoparticles of component (iii) are then coated onto and in direct physical contact with component (ii).

In other embodiments, nanoparticles of component (ii) are embedded within particle cores of component (i). In the embedded arrangement, the particle cores of component (i) are necessarily larger than the nanoparticles of component (ii). As the nanoparticles of component (ii) serve a critical role in the present invention of enhancing the catalytic properties of component (iii), the present invention requires that at least a portion of the nanoparticles of component (ii) are not completely embedded in the particle cores of component (i). That is, at least a portion of the nanoparticles of component (ii) should have surfaces that protrude above the surface (i.e., outward, away from the inner portion of the core) of the component (i) particle in which they are embedded in order for catalyst nanoparticles of component (iii) to be in contact with surfaces of nanoparticles of component (ii). In some embodiments, all nanoparticles of component (ii) are at least partially embedded in the particles of component (i). In other embodiments, some nanoparticles of component (ii) are at least partially embedded in the particles of component (i) while some nanoparticles of component (ii) reside on the surface of particles of component (i) without being embedded within the particles of component (i). In a first set of exemplary embodiments, nanoparticles of cerium oxide are embedded within particle cores of silicon oxide, aluminum oxide, or a combination of silicon and aluminum oxides. In a second set of exemplary embodiments, nanoparticles of zirconium oxide are embedded within particle cores of silicon oxide, aluminum oxide, or a combination of silicon and aluminum oxides. In a third set of embodiments, nanoparticles containing a combination of cerium and zirconium oxides are embedded within particle cores of silicon oxide, aluminum oxide, or a combination of silicon and aluminum oxides.

The catalyst includes, as a third component (i.e., "component iii"), nanoparticles composed of one or more catalytically active noble (precious) metals, typically located in Groups 9-11 of the Periodic Table of the Elements. The term "catalytically active" refers at least to the ability of the catalytically active metal to treat fuel combustion exhaust. In particular embodiments, the catalytic metal is palladium, platinum, or a mixture or alloy thereof. The nanoparticles of component (iii) are in contact with at least component (ii), i.e., oxides of zirconium and/or cerium. Surfaces of the catalytic nanoparticles of component (iii) should be exposed and accessible to fuel combustion exhaust. Thus, the catalytic nanoparticles of component (iii) are necessarily not embedded within components (i) or (ii), nor should the catalytic nanoparticles of component (iii) be covered (e.g., coated or surrounded) by components (i) or (ii). At least a portion or all of the catalytic nanoparticles of component (iii) are in direct physical contact with component (ii). The catalytic nanoparticles of component (iii) may or may not also be in direct physical contact with component (i). The catalytic nanoparticles of component (iii) at least partially cover the combined arrangement of components (i) and (ii), with at least a portion of the catalytic nanoparticles of component (iii) in direct physical contact with component (ii). In some embodiments, the catalytic nanoparticles of component (iii) speckle surfaces of the combined arrangement of components (i) and (ii), with substantially no direct physical contact between nanoparticles of component (iii). In other embodiments, the catalytic nanoparticles of component (iii) cover surfaces of the combined arrangement of components (i) and (ii) more densely, to the extent that at least a portion of nanoparticles of component (iii) are in direct physical contact with each other. In some embodiments, nanoparticles of component (iii) completely surround the combined arrangement of components (i) and (ii), wherein the term "surround," as used herein, refers to substantial (i.e., at least 80 or 90% coverage) or complete (i.e., at or about 100%) coverage of the surfaces of the combined arrangement of components (i) and (ii).

The catalytic nanoparticles of component (iii) reside on surfaces of the combined arrangement of components (i) and (ii), whether components (i) and (ii) have a core-shell or embedded arrangement, as described above. In the case of components (i) and (ii) being in a core-shell arrangement, the catalytic nanoparticles of component (iii) will necessarily be in direct physical contact with component (ii), i.e., cerium oxide, zirconium oxide, or a combination of cerium and zirconium oxides. For example, an inner core composed of a particle of component (i) may be surrounded by a multiplicity of nanoparticles of component (ii), which is, in turn, in direct physical contact with a multiplicity of nanoparticles of component (iii). In the case of components (i) and (ii) having an embedded arrangement in which nanoparticles of component (ii) are embedded within particles of component (i), at least a portion of nanoparticles of component (iii) are in direct physical contact with portions of nanoparticles of component (ii) that are accessible and not completely embedded within particles of component (i). The nanoparticles of component (iii) are present in any catalytically effective amount, typically an amount of 0.1-4 wt. % by weight of the catalyst. In different embodiments, nanoparticles of component (iii) are present in an amount of 0.1, 0.2, 0.5, 1, 1.5, 2, 2.5, 3, 3.5, or 4 wt. % by weight of the catalyst, or in an amount within a range bounded by any two of the foregoing values (e.g., at least 0.1, 0.2, 0.5, or 1 wt. % and up to 2, 3, or 4 wt. %).

The catalyst described herein can be synthesized by any suitable means, as modified from methods of the prior art, as necessary, to produce the novel catalyst compositions described herein. For example, to form an arrangement of components (i) and (ii) in which nanoparticles of component (ii) are coated onto particles of component (i), a cerium alkoxide and/or zirconium alkoxide precursor can be made to undergo sol-gel hydrolysis in the presence of silica, alumina, or aluminosilicate particles, such that sol-gel nanoparticles of cerium oxide and/or zirconium oxide (component ii) become deposited on surfaces of silica, alumina, or aluminosilicate particles (component i). To form an arrangement of components (i) and (ii) in which nanoparticles of component (ii) are embedded within particles of component (i), an incipient wetness impregnation method can be used in which cerium oxide and/or zirconium oxide nanoparticles (component ii) are combined in solution with particles of silica, alumina, or aluminosilicate (component i). The resulting arrangement of components (i) and (ii) is typically dried and calcined to produce the final oxide structure. To coat the arrangement of components (i) and (ii) with nanoparticles of component (iii), the combined arrangement of components (i) and (ii) is impregnated with a salt or complex of the noble metal(s) being used for component (iii), followed by drying and calcination.

In another aspect, the present disclosure is directed to a method of treating fuel combustion exhaust by contacting the fuel combustion exhaust with any of the catalyst compositions described above at a temperature of at least 100° C. In different embodiments, and dependent on the combustion system being treated and other factors, the temperature at which the catalyst is contacted with the combustion exhaust is precisely or at least, for example, 100° C., 150° C., 200° C., 250° C., 300° C., 350° C., 400° C., 450° C., 500° C., 550° C., 600° C., 650° C., 700° C., 750° C., 800° C., 850° C., or 900° C., or a temperature within a range bounded by any two of the foregoing values, such as 100-900° C., 150-900° C., 200-900° C., 100-850° C., 150-850° C., 200-850° C., 100-800° C., 150-800° C., or 200-800° C.

In a first set of embodiments, the catalyst described herein preferably exhibits a high conversion of CO, total hydrocarbon, and/or $NO_x$ at 100° C., 125° C., 150° C., 200° C., or 250° C. For example, the catalyst may exhibit a conversion of at least or above 50%, 55%, 60%, 65%, 70%, 75%, 80%, 85%, 90%, or 95% at 100° C., 125° C., 150° C., 200° C., or 250° C., or across a range bounded by any two of the foregoing temperatures. In some embodiments, the catalyst described herein exhibits a high conversion of CO, total hydrocarbon, and/or $NO_x$ at 250° C., 300° C., 350° C., 400° C., or 450° C. For example, the catalyst may exhibit a conversion of at least or above 60%, 65%, 70%, 75%, 80%, 85%, or 90% at 250° C., 300° C., 350° C., 400° C., or 450° C., or across a range bounded by any two of the foregoing temperatures. In some embodiments, the catalyst described herein exhibits a high conversion of CO, total hydrocarbon, and/or $NO_x$ at 500° C., 525° C., 550° C., 575° C., or 600° C. For example, the catalyst may exhibit a conversion of at least or above 60%, 65%, 70%, 75%, 80%, 85%, or 90% at 500° C., 525° C., 550° C., 575° C., or 600° C., or across a range bounded by any two of the foregoing temperatures.

In some embodiments, prior to contacting the catalyst with the fuel combustion exhaust, the catalyst is hydrothermally aged at a temperature within a range of 800-900° C. for at least 8, 9, 10, 11, 12, 13, or 14 hours. In preferred embodiments, the catalyst maintains or improves its conversion ability compared to the catalyst that has not been hydrothermally aged. In particular embodiments, the catalyst maintains or improves its conversion ability after hydrothermal treatment at a temperature of 100° C., 125° C., 150° C., 200° C., or 250° C. In some embodiments, the catalyst does not maintain or improve its conversion ability after hydrothermal treatment at a particular temperature, but the catalyst achieves a conversion that is within at least 80, 85, 90, or 95% of the conversion achieved without hydrothermal treatment.

In some embodiments, the catalyst described above is mixed with or affixed onto a refractory support material, such as those refractory materials suitable for operation in a catalytic converter. The support material may be, for example, cordierite or mullite. The support material can be a powder (e.g., having any of the above particle sizes), granular (e.g., 0.5 mm or greater particle size), a bulk material, such as a honeycomb monolith of the flow-through type, a plate or multi-plate structure, or corrugated metal sheets. If a honeycomb structure is used, the honeycomb structure can contain any suitable density of cells. For example, the honeycomb structure can contain 100, 200, 300, 400, 500, 600, 700, 800, or 900 cells/$in^2$ (or from 62-140 cells/$cm^2$) or greater. Honeycomb structures, in particular, are described in detail in, for example, U.S. Pat. Nos. 5,314,665, 7,442,425, and 7,438,868, the contents of which are incorporated herein by reference in their entirety. When corrugated or other types of metal sheets are used, these can be layered on top of each other with catalyst material supported on the sheets such that passages remain that allow the flow of exhaust gas between the sheets. The layered sheets can also be formed into a structure, such as a cylinder, by winding the sheets.

In another aspect, the invention is directed to a catalytic converter that contains the above-described catalyst. The catalyst is typically disposed on a refractory supporting element, such as corrugated metal sheets or a honeycomb structure, as described above. The catalytic converter can be any of the catalytic converters known in the art, and particularly, those catalytic converters particularly suited for processing diesel fuel exhaust. The construction and operation of such catalytic converters are well known in the art, as described in detail in, for example, U.S. Pat. Nos. 7,691,340, 7,678,348, 7,575,727, 7,442,425, 7,438,868, 7,412,824, 7,288,230, 6,919,052, and 5,314,665, the contents of which are all herein incorporated by reference in their entirety.

As basic elements, the catalytic converter typically contains the catalyst disposed on a supporting element such that passages are made available for exhaust to pass therethrough, and the supported catalyst enclosed in a metal casing. The metal casing is generally connected with one or more inlets (i.e., pipes) for transferring exhaust gases into the supported catalyst. The metal casing may also include one or more gaskets.

In some embodiments, the catalytic converter is connected with a source of ammonia in order for ammonia to mix in with the stream of exhaust gas. As is well known in the art, the ammonia functions as a reductant in selective catalytic reduction (SCR) processes. The ammonia can be in any suitable form, such as anhydrous ammonia, aqueous ammonia, urea, ammonium carbonate, ammonium formate, or ammonium carbamate. In some embodiments, the ammonia source is supplied continuously into the exhaust stream before and/or during the time the exhaust stream reaches the catalyst. In other embodiments, the ammonia is supplied intermittently. In other embodiments, the ammonia source is supplied before the exhaust stream reaches the catalyst. In this way, the ammonia source is first absorbed into the catalyst before reacting with the exhaust stream. Generally, an ammonia storage tank is used to contain the ammonia source.

In designing a SCR system, numerous other elements can be interconnected with the catalytic converter and ammonia source. For example, a vaporizer can be included between the ammonia source and catalytic converter for converting (i.e., decomposing) the ammonia source into ammonia gas. A mixer may also be incorporated between the ammonia source and catalytic converter (or between vaporizer and catalytic converter) to mix ammonia with the exhaust stream. Other elements, such as heaters, pumps, and fans, can be included in order to optimize the system. The SCR system can be integrated into any system that makes use of a lean burn engine, particularly those engines that use diesel fuel. The SCR system can be integrated into, for example, the engine system of a passenger vehicle, truck, utility boiler, industrial boiler, solid waste boiler (i.e., as used in the processing of municipal waste), ship, locomotive, tunnel boring machine, submarine, construction equipment, gas turbine, power plant, airplane, lawnmower, or chainsaw.

Examples have been set forth below for the purpose of illustration and to describe certain specific embodiments of the invention. However, the scope of this invention is not to be in any way limited by the examples set forth herein.

EXAMPLES

Preparation of Pd Supported on $SiO_2$(core)@$ZrO_2$(shell), CeZr—$Al_2O_3$, or Ce—$Al_2O_3$ A $SiO_2$@$ZrO_2$ mixed oxide composition was synthesized, with some modifications, as reported previously (e.g., Arnal et al., *Chem. Mater.*, 18, 2733-2739, 2006; Arnal et al., *Angew. Chem. Int. Ed.*, 45, 8224-8227, 2006; and Tang et al., *Adv. Funct. Mater.*, 20, 2442-2447, 2010). Briefly, monodisperse silica spheres were prepared following the Stöber process, where hydrolysis and condensation of a $Si(OC_2H_5)_4$ precursor leads to the formation of ≡Si—O—Si≡ bonds (Stöber et al., *J. Colloid Interface Sci.*, 26, 62-69, 1968; and Hench et al., *Chem. Rev.*, 90, 33-72, 1990). When sufficient Si—O—Si bonds are formed through a polycondensation reaction, they behave as colloidal particles or sol. FIG. 1 provides a general representation of the process. As indicated in FIG. 1, the $SiO_2$ spheres, as formed, were dispersed in 100 g of ethanol and heated to 30° C., as reported previously (Arnal et al., *Chem. Mater.*, 18, 2733-2739, 2006). Afterwards, 1 mL of Brij 30 and 1 mL of deionized (DI) water were added. $Zr(OBu)_4$ (1.8 mL) was added after stirring for one hour, and the reaction was allowed to proceed for 8 hours at 30° C. The liquid phase of the colloid was then exchanged for DI water, and the particles, as formed, were aged at room temperature for three days. The particles were separated, dried at 120° C. overnight, and calcined at 700° C. for two hours.

Figure 2:
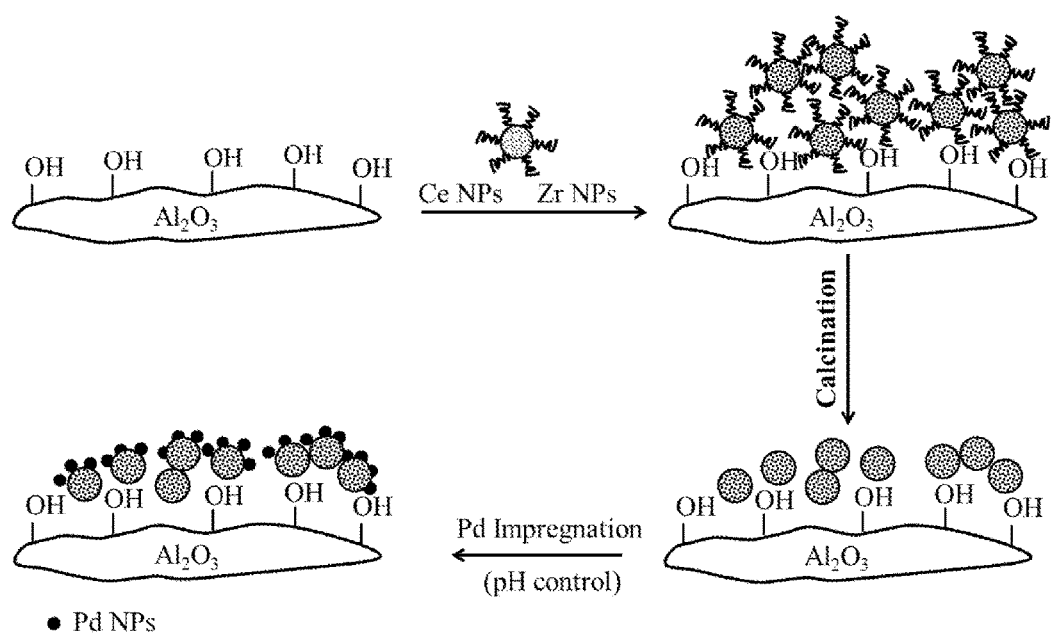
FIG. 2. Schematic showing an exemplary procedure for synthesizing a Pd/CeZr-oxide/$Al_2O_3$ catalyst composition.

A double and single incipient wetness impregnation was performed for the synthesis of CeZr—$Al_2O_3$ and Ce—$Al_2O_3$ oxide supports, respectively. In each case, the pore volume of $Al_2O_3$ was measured (0.76 cm$^3$/g), and amounts of cerium-zirconium and cerium oxide nanoparticles dispersions equal to the pore volume of $Al_2O_3$ were added dropwise. In the case of CeZr—$Al_2O_3$, after the completion of the first incipient wetness impregnation, the sample was dried and a subsequent incipient wetness impregnation was performed. The final oxide supports, $Ce_{0.4}Zr_{0.034}$-$Al_2O_3$ and $Ce_{0.27}$—$Al_2O_3$, were dried at 120° C. overnight and calcined at 500° C. for two hours. FIG. 2 provides a general representation of the process.

The resulting oxide supports were impregnated with a $Pd(NH_3)_4(NO_3)_2$ solution (0.1 g Pd/100 mL concentration) by a wet impregnation method where the pH was adjusted to 4 with $HNO_3$ until all the solvent was evaporated, thus leading to 1, 2, and 4 wt. % Pd loadings. After the impregnation, the catalyst was dried at 120° C. in air and calcined at 500° C. for two hours.

As described above, the accessible surface area of $ZrO_2$ was enhanced by depositing a layer of $ZrO_2$ on $SiO_2$ spheres, leading to the formation of a core@ shell structure, with $SiO_2$ located in the core and $ZrO_2$ on the shell. The $SiO_2$@$ZrO_2$ core-shell structure was verified using TEM and EDX. The surface area of the material was 220 m$^2$/g, much higher than the surface area of bulk $ZrO_2$ (~58 m$^2$/g). Most importantly, the $SiO_2$@$ZrO_2$ support was able to maintain its surface area even after thermal treatments in air at 700 and 800° C.

As also described above, Pd/CeZr—$Al_2O_3$ and Pd/Ce—$Al_2O_3$ catalysts were synthesized by impregnating CeZr-oxide and Ce-oxide aqueous nanoparticles (~5 nm), respectively, onto $Al_2O_3$ via an incipient wetness method followed by a pH controlled impregnation of a $Pd(NH_3)_4(NO_3)_2$ precursor, thus leading to Pd nanoparticles in close proximity to $CeO_x$. Catalytic performance of Pd/$SiO_2$@$ZrO_2$, Pd/CeZr—$Al_2O_3$ and Pd/Ce—$Al_2O_3$ catalysts, with Pd loadings varying from 1 to 2 and 4 wt. %, was measured under lean and stoichiometric reaction conditions as follows: temperature increased from 100 to 500° C. at 2° C./min, total flow rate 333 ml/min, lean reaction mixture: 12% $O_2$, 6% $H_2O$, 6% $CO_2$, 400 ppm $H_2$, 2000 ppm CO, 100 ppm NO, 1667 ppm $C_2H_4$, 1000 ppm $C_3H_6$ and 333 ppm $C_3H_8$ in Ar balance, stoichiometric reaction mixture: stoichiometric $O_2$, 10% $H_2O$, 5% $CO_2$, 1700 ppm $H_2$, 5000 ppm CO, 1000 ppm NO, 525 ppm $C_2H_4$, 500 ppm $C_3H_6$ and 150 ppm $C_3H_8$ in Ar balance.

The performance of Pd catalysts was evaluated in fresh and hydrothermally aged states. Overall, Pd/CeZr—$Al_2O_3$ catalyst showed considerably higher CO and hydrocarbon oxidation performance than Pd/$SiO_2$@$ZrO_2$ under the conditions used. The 2 wt. % Pd/CeZr—$Al_2O_3$ was observed to exhibit the best low temperature performance and hydrothermal durability under stoichiometric conditions. On the other hand, 4 wt. % Pd/CeZr—$Al_2O_3$ was observed to suffer significant performance loss due to Pd particle coarsening.

Figure 3:
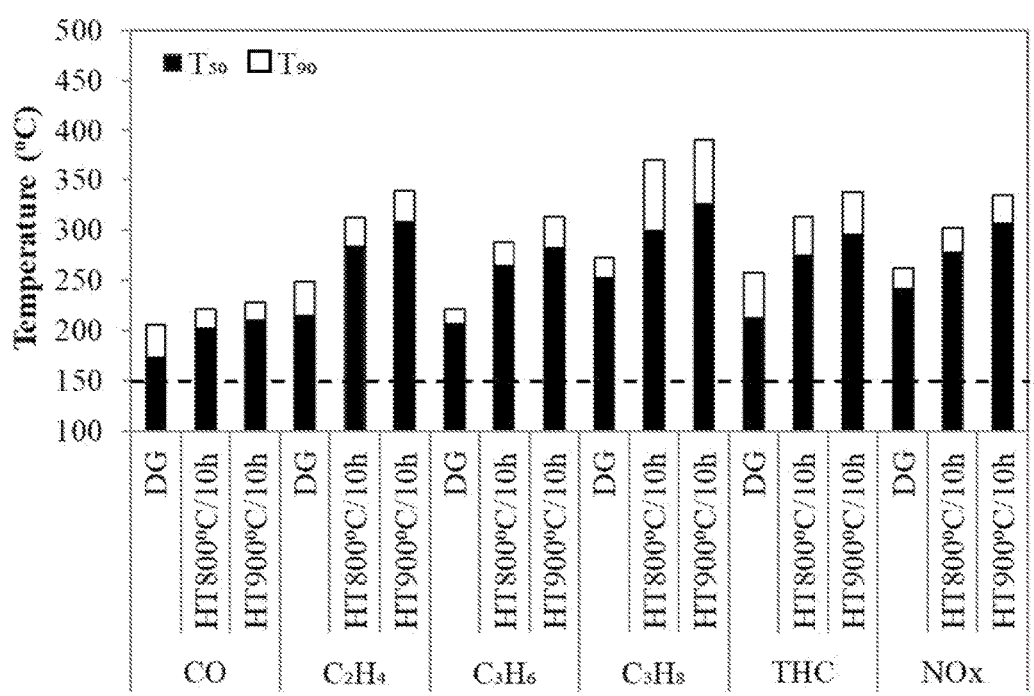
FIG. 3. Graph showing temperature at 50 and 90% conversions of CO, $C_2H_4$, $C_3H_6$, $C_3H_8$, THCs and $NO_x$ over 1 wt. % Pd/Ce—$Al_2O_3$ catalysts in its degreened (DG) state and after hydrothermal aging (under ACEC SGDI conditions) at 800 and 900° C. for 10 hours.
Figure 4A:
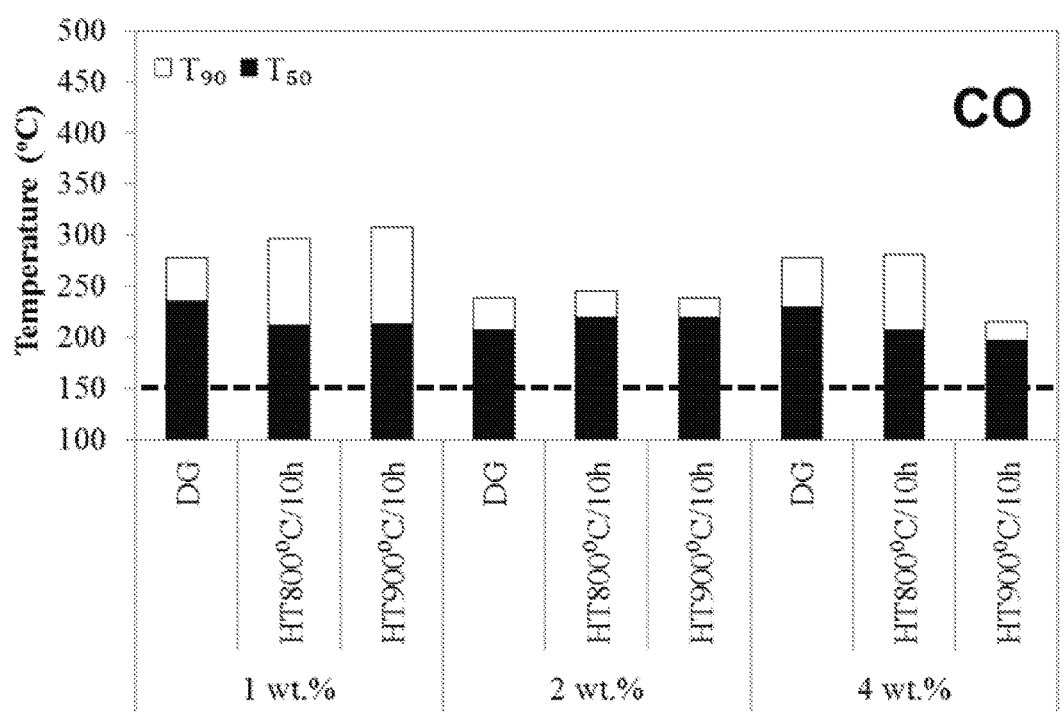
FIGS. 4A-4C. Graphs showing temperature at 50 and 90% conversion of CO (FIG. 4A), THCs (FIG. 4B) and $NO_x$ (FIG. 4C) over 1, 2 and 4 wt. % Pd/$SiO_2$@$ZrO_2$ catalyst in its degreened (DG) state and after hydrothermal aging (under ACEC SGDI conditions) at 800 and 900° C. for 10 hours.
Figure 4B:
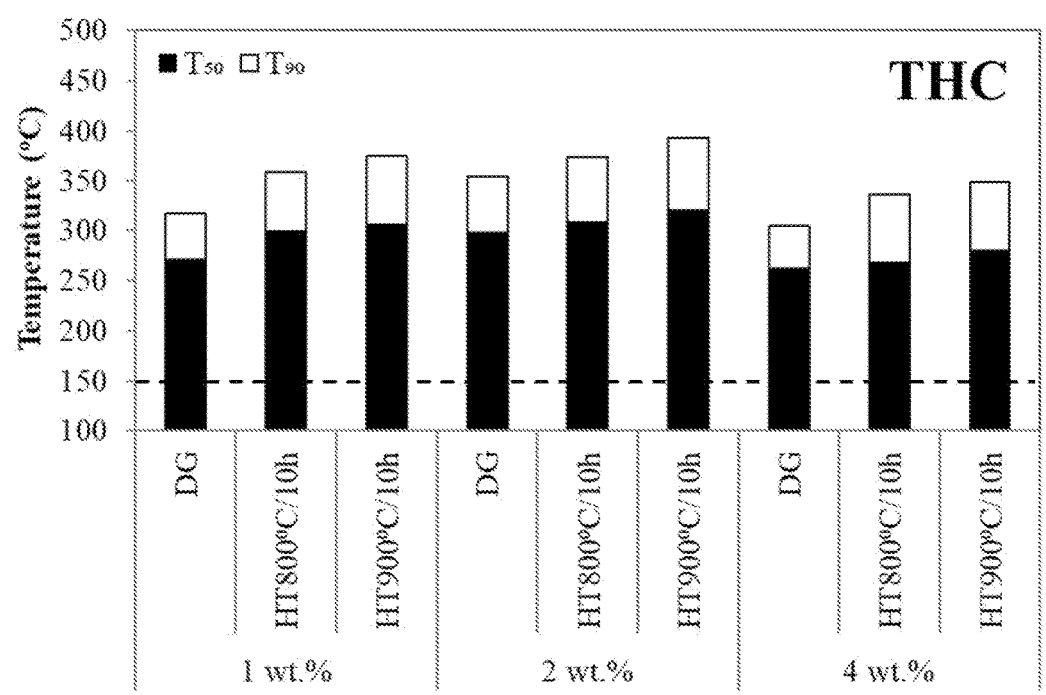
Figure 4C:
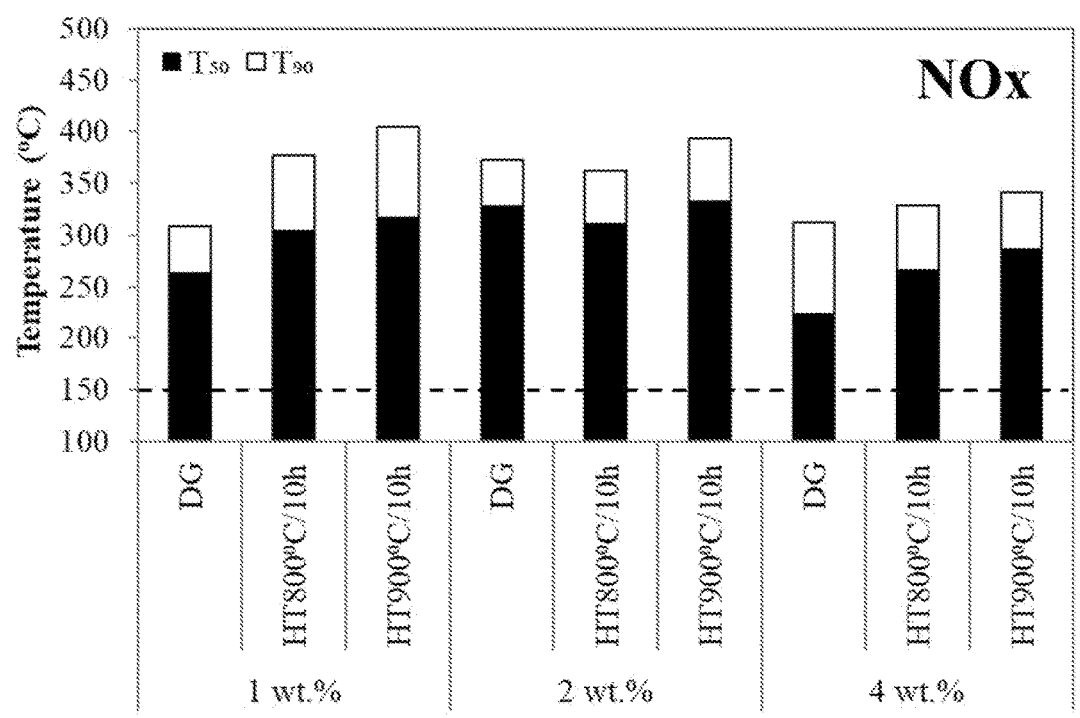

FIG. 3 shows that the 1 wt. % Pd/Ce—$Al_2O_3$ catalyst has a promising catalytic activity in the degreed (DG) state and it slightly loses its activity after hydrothermal aging at 800° C. and 900° C. for 10 hours. Specifically, the temperature of 50% conversion ($T_{50}$) for CO, THC and $NO_x$ in the degreed state are 174, 215 and 241° C., respectively, and 211, 296 and 307° C., respectively, after hydrothermal aging at 900° C. for 10 hours. On the other hand, as shown by the data in FIGS. 4A-4C for Pd/$SiO_2$@$ZrO_2$ catalysts, the 1, 2 and 4 wt. % Pd/$SiO_2$@$ZrO_2$ catalysts do not show a substantial deactivation after aging (very durable) and the 4 wt. % Pd/$SiO_2$@$ZrO_2$ showed a slightly better performance compared to the 1 and 2 wt. %.

Figure 5:
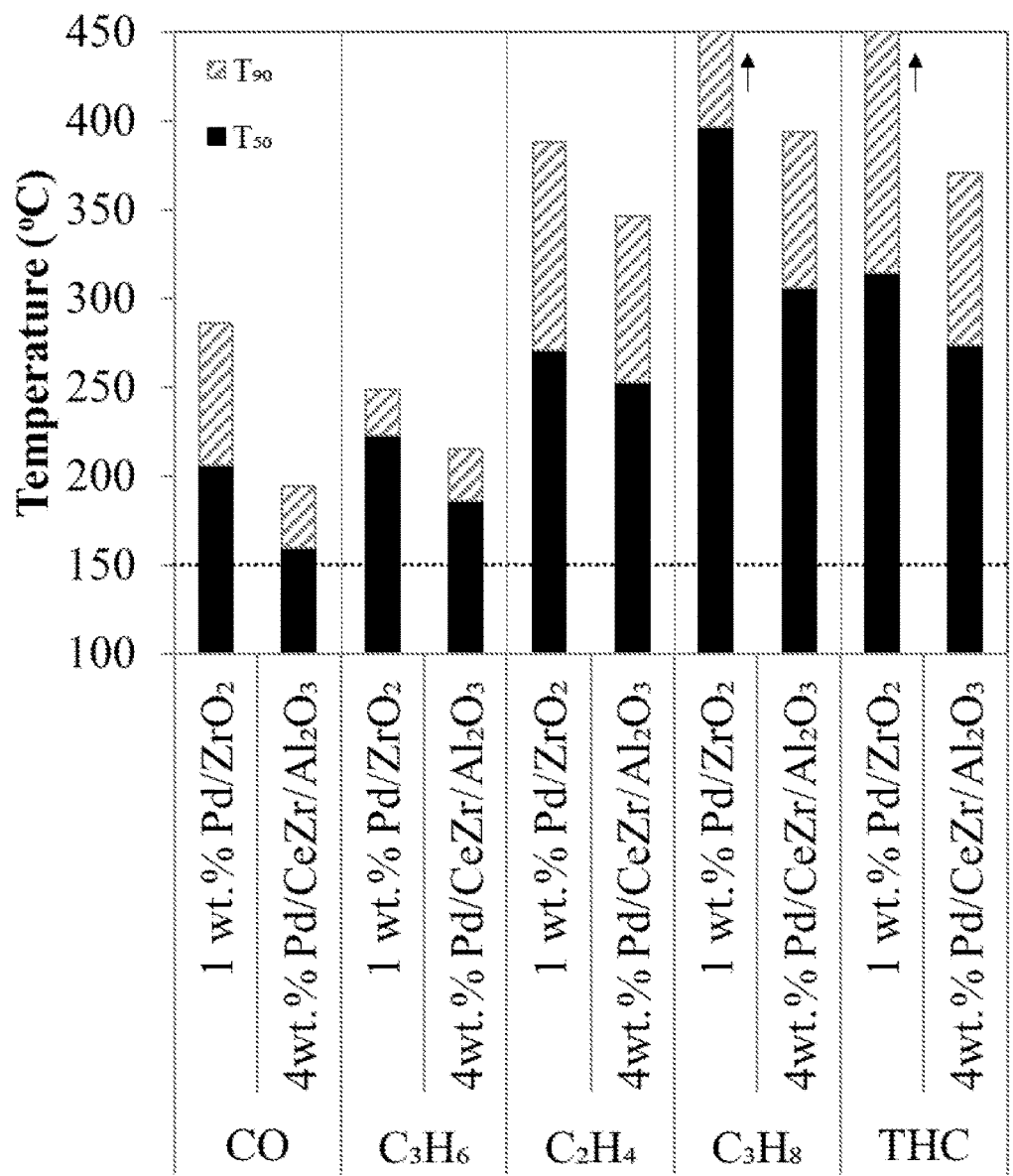
FIG. 5. Graph showing temperature at 50 and 90% conversions of CO, $C_2H_4$, $C_3H_6$, $C_3H_8$ and THCs over 1 wt. % Pd/CeZr—$Al_2O_3$ and 1 wt. % Pd/$ZrO_2$ catalysts in their degreened (DG) state (under ACEC LTC-D conditions).

FIG. 5 is a graph showing temperature at 50 and 90% conversions of CO, $C_2H_4$, $C_3H_6$, $C_3H_8$ and THCs over 1 wt. % Pd/CeZr—$Al_2O_3$ and 1 wt. % Pd/$ZrO_2$ catalysts in their degreed (DG) state (under ACEC LTC-D conditions). The graph in FIG. 5 shows that 4 wt. % Pd/CeZr—$Al_2O_3$ catalyst has an improved performance compared to 1 wt. % Pd/$ZrO_2$ towards the conversion of CO, $C_3H_6$, $C_2H_4$, $C_3H_8$ and THCs. Specifically, $C_3H_8$ is not able to reach 90% conversion over 1 wt. % Pd/$ZrO_2$, whereas 4 wt. % Pd.CeZr—$Al_2O_3$ is able to reach 90% conversion of $C_3H_8$ at around 390° C.

Figure 6:
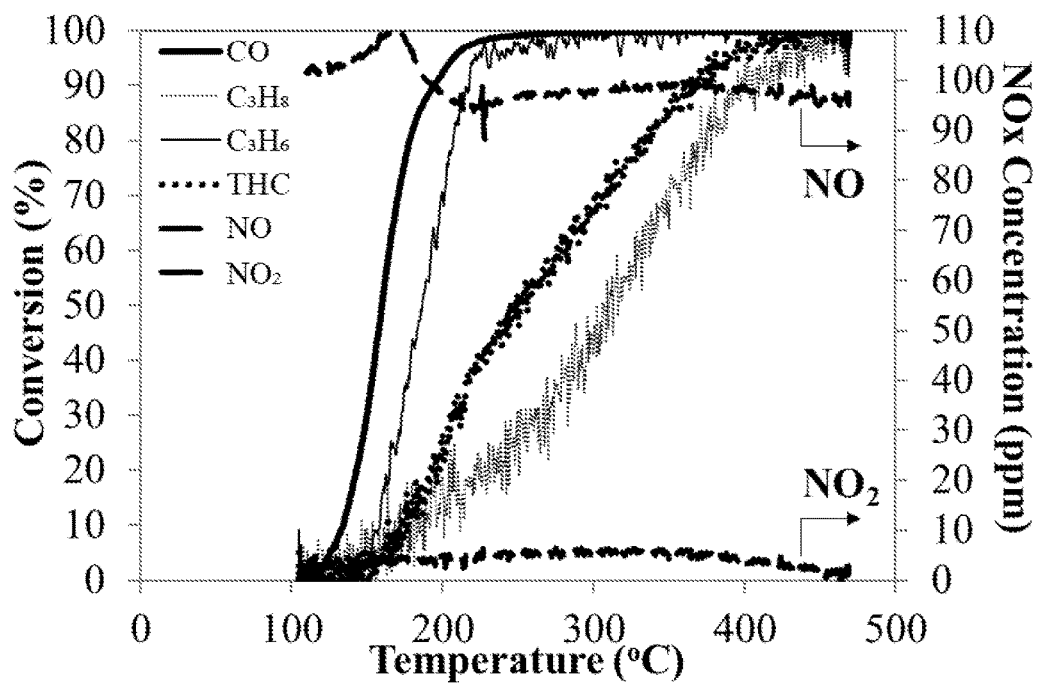
FIG. 6. Graph showing conversion of CO, THCs, $NO_x$, $C_3H_8$, $C_2H_4$ and $C_3H_6$ as a function of temperature for degreened 4 wt. % Pd/CeZr—$Al_2O_3$.
Figure 7:
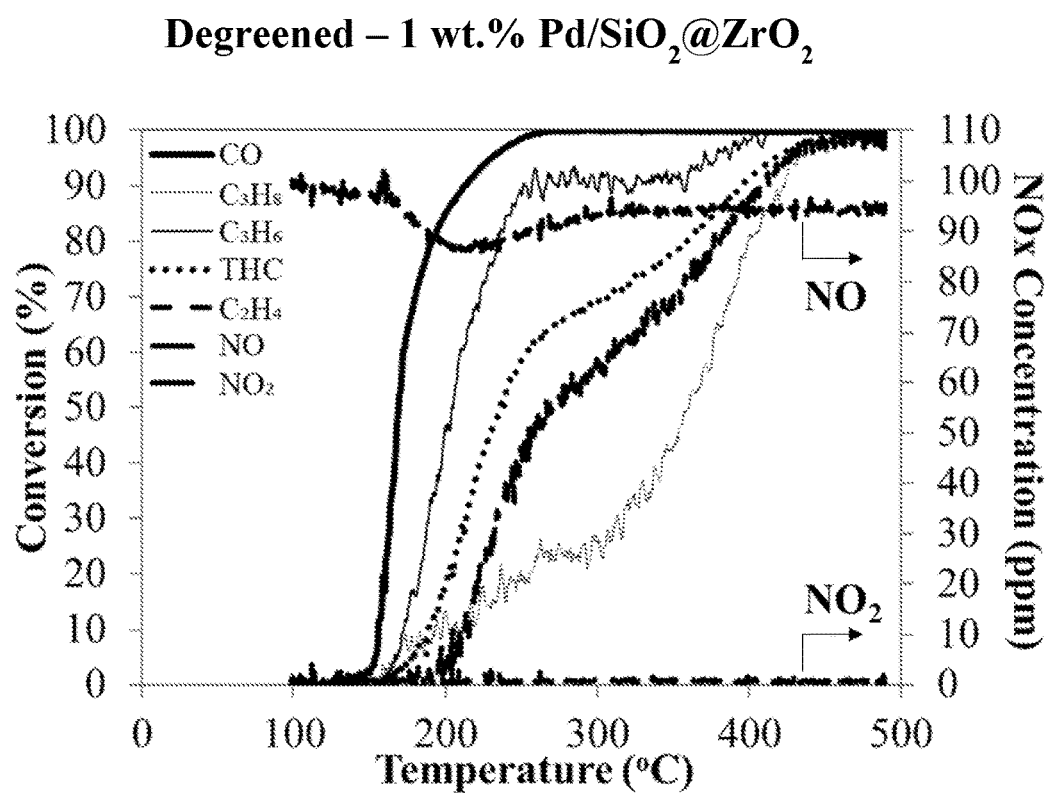
FIG. 7. Graph showing conversion of CO, THCs, $NO_x$, $C_3H_8$, $C_2H_4$ and $C_3H_6$ as a function of temperature for degreened 1 wt. % Pd/$SiO_2$@$ZrO_2$.
Figure 8:
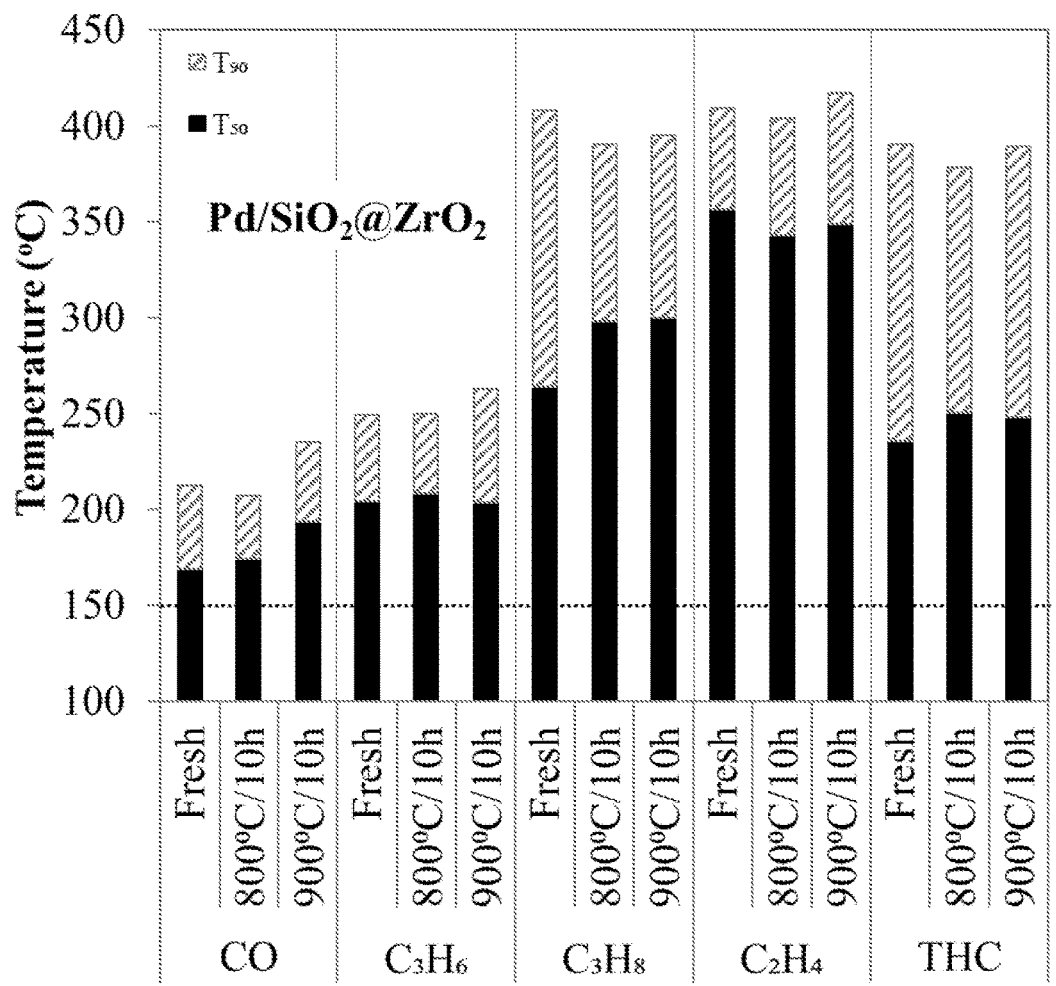
FIG. 8. Graph showing temperature at 50 and 90% conversions of CO, $C_2H_4$, $C_3H_6$, $C_3H_8$ and THCs over 1 wt. % $Pd/SiO_2@ZrO_2$ catalyst in its degreened (fresh) state and after hydrothermal aging (under ACEC LTC-D conditions) at 800 and 900° C. for 10 hours.
Figure 9:
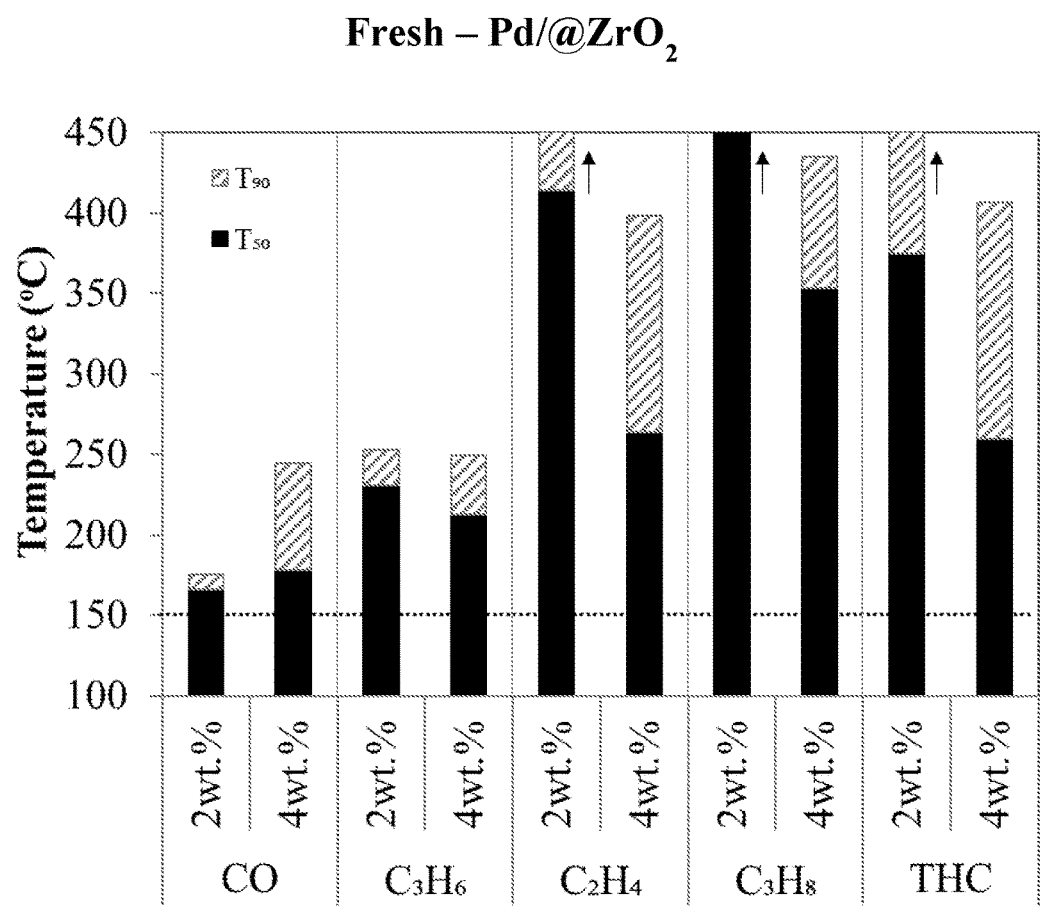
FIG. 9. Graph showing temperature at 50 and 90% conversions of CO, $C_2H_4$, $C_3H_6$, $C_3H_8$ and THCs over 2 and 4 wt. % $Pd/@ZrO_2$ catalyst in its degreened (fresh) state and after hydrothermal aging (under ACEC LTC-D conditions) at 800 and 900° C. for 10 hours.
Figure 10:
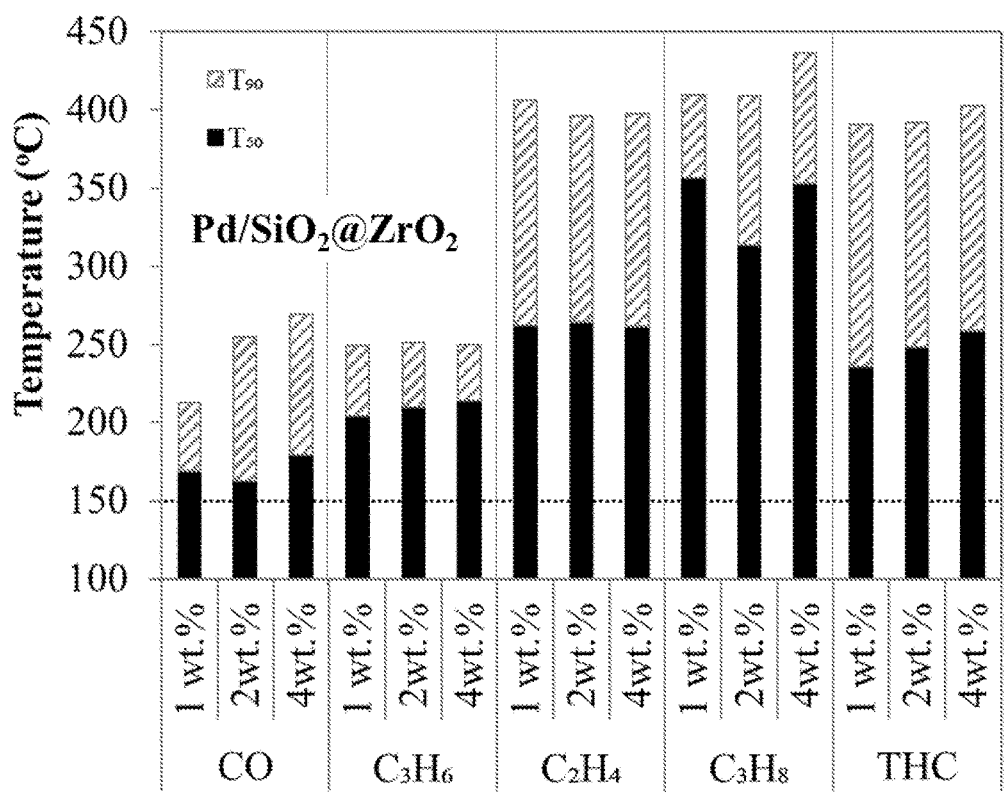
FIG. 10. Graph showing temperature at 50 and 90% conversions of CO, $C_2H_4$, $C_3H_6$, $C_3H_8$ and THCs over 1, 2 and 4 wt. % $Pd/SiO2@ZrO_2$ catalysts in their degreened state (under ACEC LTC-D conditions).

FIG. 6 is a graph showing conversion of CO, THCs, $NO_x$, $C_3H_8$, $C_2H_4$ and $C_3H_6$ as a function of temperature for degreened 4 wt. % Pd/CeZr—$Al_2O_3$, while FIG. 7 is a graph showing conversion of CO, THCs, $NO_x$, $C_3H_8$, $C_2H_4$ and $C_3H_6$ as a function of temperature for degreened 1 wt. % Pd/$SiO_2$@$ZrO_2$. FIG. 8 shows the temperature at 50 and 90% conversion of CO, $C_3H_6$, $C_3H_8$, $C_2H_4$ and THCs over 1 wt. % Pd/$SiO_2$@$ZrO_2$. This result indicates that 1 wt. % Pd/$SiO_2$@$ZrO_2$ is able to maintain its performance after hydrothermal aging at 800 and 900° C. for 10 hours. FIG. 9 is a graph showing temperature at 50 and 90% conversions of CO, $C_2H_4$, $C_3H_6$, $C_3H_8$ and THCs over 2 and 4 wt. % Pd/@$ZrO_2$ catalyst in its degreened (fresh) state and after hydrothermal aging (under ACEC LTC-D conditions) at 800 and 900° C. for 10 hours. FIG. 10 is a graph showing temperature at 50 and 90% conversions of CO, $C_2H_4$, $C_3H_6$, $C_3H_8$ and THCs over 1, 2 and 4 wt. % Pd/SiO2@$ZrO_2$ catalysts in their degreened state (under ACEC LTC-D conditions). As shown by FIG. 10, increasing the Pd loading on $SiO_2$@$ZrO_2$ from 1 to 2, 4 wt. % did not lead to an improved activity of the Pd/$SiO_2$@$ZrO_2$ catalyst. However, increasing the Pd loading on @$ZrO_2$ ($SiO_2$@$ZrO_2$ oxide support where the $SiO_2$ core has been removed) led to enhancement of the hydrocarbon conversion at lower temperatures.

While there have been shown and described what are at present considered the preferred embodiments of the invention, those skilled in the art may make various changes and modifications which remain within the scope of the invention defined by the appended claims.

What is claimed is:

1. A catalyst for treating fuel combustion exhaust, the catalyst comprising the following components:
   (i) an oxide inner core comprising silicon oxide, aluminum oxide, or a combination of silicon oxide and aluminum oxide;
   (ii) an outer layer comprising nanoparticles or an amorphous shell of cerium oxide, zirconium oxide, or a combination of cerium oxide and zirconium oxide as a coating on said oxide inner core; and
   (iii) nanoparticles comprising elemental palladium or platinum in contact with at least component (ii), wherein said nanoparticles comprising palladium or platinum are present in an amount of 0.1-4 wt. % by weight of the catalyst, and wherein surfaces of said nanoparticles comprising elemental palladium or platinum are exposed.

2. The catalyst of claim 1, wherein said catalyst comprises:
   (i) an oxide inner core comprising silicon oxide, aluminum oxide, or combination of silicon oxide and aluminum oxide;
   (ii) an outer layer comprising nanoparticles of zirconium oxide or cerium oxide or combination of zirconium oxide and cerium oxide as a coating on said oxide inner core; and
   (iii) nanoparticles comprising elemental palladium or platinum coated on said outer layer, wherein said nanoparticles comprising palladium or platinum are present in an amount of 0.1-4 wt. % by weight of the catalyst.

3. The catalyst of claim 1, wherein said outer layer comprises nanoparticles or an amorphous shell of zirconium oxide and said oxide inner core comprises silicon oxide.

4. The catalyst of claim 1, wherein said catalyst comprises:
   (i) particles comprising silicon oxide, aluminum oxide, or combination of silicon oxide and aluminum oxide;
   (ii) nanoparticles of cerium oxide, zirconium oxide, or a combination of cerium oxide and zirconium oxide embedded within particles of component (i), provided that at least a portion of said nanoparticles of cerium oxide, zirconium oxide, or combination of cerium oxide and zirconium oxide are not completely embedded within the particles of component (i); and
   (iii) nanoparticles comprising elemental palladium or platinum in contact with at least component (ii), wherein said nanoparticles comprising palladium or platinum are present in an amount of 0.1-4 wt. % by weight of the catalyst, and wherein surfaces of said nanoparticles comprising elemental palladium or platinum are exposed.

5. The catalyst of claim 4, wherein component (i) comprises aluminum oxide.

6. The catalyst of claim 1, wherein said nanoparticles comprising palladium or platinum are present in an amount of 0.1-3 wt. % by weight of the catalyst.

7. The catalyst of claim 1, wherein said nanoparticles comprising palladium or platinum are present in an amount of 0.1-2 wt. % by weight of the catalyst.

8. A method of treating fuel combustion exhaust, the method comprising contacting said fuel combustion exhaust with a catalyst at a temperature of 100-900° C., the catalyst comprising the following components:
   (i) an oxide inner core comprising silicon oxide, aluminum oxide, or a combination of silicon oxide and aluminum oxide;
   (ii) an outer layer comprising nanoparticles or an amorphous shell of cerium oxide, zirconium oxide, or a combination of cerium oxide and zirconium oxide as a coating on said oxide inner core; and
   (iii) nanoparticles comprising elemental palladium or platinum in contact with at least component (ii), wherein said nanoparticles comprising palladium or platinum are present in an amount of 0.1-4 wt. % by weight of the catalyst, and wherein surfaces of said nanoparticles comprising elemental palladium or platinum are exposed and accessible to said fuel combustion exhaust.

9. The method of claim 8, wherein said catalyst exhibits at least 50% conversion of CO, total hydrocarbon, or $NO_x$ at 150° C.

10. The method of claim 8, wherein said catalyst exhibits at least 90% conversion of CO, total hydrocarbon, or $NO_x$ at 350° C.

11. The method of claim 8, wherein said catalyst exhibits at least 90% conversion of CO, total hydrocarbon, or $NO_x$ at 300° C.

12. The method of claim 8, wherein said catalyst is hydrothermally aged at a temperature of 800-900° C. for at least 8 hours, prior to contacting the catalyst with the fuel combustion exhaust, and the catalyst maintains at least 50% conversion of CO, total hydrocarbon, or $NO_x$ at 150° C. after being hydrothermally aged.

13. The method of claim 8, wherein said catalyst is hydrothermally aged at a temperature of 800-900° C. for at least 8 hours, prior to contacting the catalyst with the fuel combustion exhaust, and the catalyst maintains at least 90% conversion of CO, total hydrocarbon, or $NO_x$ at 300° C. after being hydrothermally aged.

14. The method of claim 8, wherein said catalyst comprises:
   (i) an oxide inner core comprising silicon oxide, aluminum oxide, or combination of silicon oxide and aluminum oxide;
   (ii) an outer layer comprising nanoparticles of zirconium oxide or cerium oxide or combination of zirconium oxide and cerium oxide as a coating on said oxide inner core; and
   (iii) nanoparticles comprising elemental palladium or platinum coated on said outer layer, wherein said nanoparticles comprising palladium or platinum are present in an amount of 0.1-4 wt. % by weight of the catalyst, and wherein surfaces of said nanoparticles comprising elemental palladium or platinum are exposed and accessible to said fuel combustion exhaust.

15. The method of claim 8, wherein said outer layer comprises nanoparticles or an amorphous shell of zirconium oxide and said oxide inner core comprises silicon oxide.

16. The method of claim 8, wherein said catalyst comprises:
   (i) particles comprising silicon oxide, aluminum oxide, or combination of silicon oxide and aluminum oxide;
   (ii) nanoparticles of cerium oxide, zirconium oxide, or a combination of cerium oxide and zirconium oxide embedded within particles of component (i), provided that at least a portion of said nanoparticles of cerium oxide, zirconium oxide, or combination of cerium oxide and zirconium oxide are not completely embedded within the particles of component (i); and
   (iii) nanoparticles comprising elemental palladium or platinum in contact with at least component (ii), wherein said nanoparticles comprising palladium or platinum are present in an amount of 0.1-4 wt. % by weight of the catalyst, and wherein surfaces of said nanoparticles comprising elemental palladium or platinum are exposed and accessible to said fuel combustion exhaust.

17. The method of claim 16, wherein component (i) comprises aluminum oxide.

18. The method of claim 8, wherein said nanoparticles comprising palladium or platinum are present in an amount of 0.1-3 wt. % by weight of the catalyst.

19. The method of claim 8, wherein said nanoparticles comprising palladium or platinum are present in an amount of 0.1-2 wt. % by weight of the catalyst.

20. The method of claim 8, wherein said catalyst is housed within a catalytic converter.

* * * * *